US012671921B2

(12) United States Patent
Zheng

(10) Patent No.: US 12,671,921 B2
(45) Date of Patent: Jun. 30, 2026

(54) SYSTEM, METHOD, AND APPARATUS FOR DEVICE CONTROL BASED ON OPTICAL COMMUNICATION

(71) Applicant: Huawei Technologies Co., Ltd., Shenzhen (CN)

(72) Inventor: Gang Zheng, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 310 days.

(21) Appl. No.: 18/489,489

(22) Filed: Oct. 18, 2023

(65) Prior Publication Data

US 2024/0048877 A1     Feb. 8, 2024

Related U.S. Application Data

(63) Continuation of application No. PCT/CN2022/079431, filed on Mar. 4, 2022.

(30) Foreign Application Priority Data

Apr. 19, 2021    (CN) .......................... 202110418709.3

(51) Int. Cl.
    *H04Q 11/00*        (2006.01)
    *H04L 69/22*        (2022.01)
(52) U.S. Cl.
    CPC ......... *H04Q 11/0066* (2013.01); *H04L 69/22* (2013.01)
(58) Field of Classification Search
    CPC ................................................. H04Q 11/0066
    See application file for complete search history.

(56) References Cited

U.S. PATENT DOCUMENTS

| | | | |
|---|---|---|---|
| 10,841,230 B1 | 11/2020 | Lee | |
| 2003/0219015 A1 | 11/2003 | Constant Six et al. | |
| 2006/0182132 A1* | 8/2006 | Kim ........................ | H04L 47/13 |
| | | | 370/401 |
| 2008/0279554 A1* | 11/2008 | Kazawa ............. | H04Q 11/0067 |
| | | | 398/69 |

(Continued)

FOREIGN PATENT DOCUMENTS

| | | |
|---|---|---|
| CN | 1469557 A | 1/2004 |
| CN | 101800915 A | 8/2010 |
| CN | 105589506 A | 5/2016 |

OTHER PUBLICATIONS

G.984.3, "Gigabit-capable passive optical networks (G-PON): Transmission convergence layer specification", ITU-T, Jan. 2014 (Year: 2014).*

(Continued)

*Primary Examiner* — Shi K Li
(74) *Attorney, Agent, or Firm* — Slater Matsil, LLP

(57) ABSTRACT

This application provides a system for device control based on optical communication. A device supporting optical communication is introduced into a conventional system for device control. The system includes a first controller, a first optical head-end, a first optical terminal, and a first field device. The first controller communicates with the first field device through the first optical head-end. The first field device communicates with the first controller through the first optical terminal. The first optical head-end communicates with the first optical terminal through an optical signal.

20 Claims, 7 Drawing Sheets

(56)                    References Cited

U.S. PATENT DOCUMENTS

2014/0314087  A1     10/2014  Kusano
2021/0111796  A1*     4/2021  Smith ................ H04B 10/0775

OTHER PUBLICATIONS

IEEE Standard for Ethernet, IEEE Computer Society, Sponsored by the LAN/MAN Standards Committee, IEEE 802.3™-2018(Revision of IEEE Std 802.3-2015), Jun. 14, 2018, total 5600 pages.
IEC 61158-2 International Standard Norme Internationale, "Industrial communication networks—Fieldbus specifications—Part 2: Physical layer specification and service definition", Edition 6.0, Jul. 2014, total 1012 pages.
IEC 61784-3 International Standard Norme Internationale, "Industrial communication networks—Profiles-Part 3: Functional safety fieldbuses—General rules and profile definitions", Edition 4.0, Feb. 2021, total 15 pages.

* cited by examiner

500

501
Terminal optical module

502
Terminal point-to-multipoint module

503
Terminal service module

504
Device control module

Primary station packet

Header field

Primary station data unit

Downlink transmission frame

Uplink transmission subframe 1

Header field 1    Data unit 1

...

Uplink transmission subframe N

Header field N    Data unit N

SYSTEM, METHOD, AND APPARATUS FOR DEVICE CONTROL BASED ON OPTICAL COMMUNICATION

CROSS-REFERENCE TO RELATED APPLICATIONS

This application is a continuation of International Application No. PCT/CN2022/079431, filed on Mar. 4, 2022, which claims priority to Chinese Patent Application No. 202110418709.3, filed on Apr. 19, 2021. The disclosures of the aforementioned applications are hereby incorporated by reference in their entireties.

TECHNICAL FIELD

This application relates to the field of device control and the field of optical communication, and more specifically, to a system, a method, and an apparatus for device control based on optical communication.

BACKGROUND

In a conventional industrial production factory, many devices and apparatuses located at a production site, for example, a sensor, a regulator, a transducer, and an actuator, are connected to a controller through cables or twisted-pair cables. The controller communicates with the devices and apparatuses at the production site by using a field bus technology. Various types of operation parameter status information and fault information of the devices at the site are transmitted to the controller away from the site through a field bus. The controller can also send various control, maintenance, and configuration commands to related devices through the field bus.

Existing field buses usually have an operation cycle at a millisecond level and a bus bandwidth of 100 Mbit/s. Consequently, neither a requirement for a microsecond-level or even lower latency in future industrial manufacturing can be met nor a requirement for a high-bandwidth network in service scenarios such as machine vision and motion control can be met. Therefore, a novel field bus technology with ultra-high bandwidth and ultra-low latency is urgently needed.

SUMMARY

Embodiments of this application provide a system, a method, and an apparatus for device control based on optical communication. Technical solutions are as follows:

According to a first aspect, this application provides a system for device control based on optical communication. A device supporting optical communication is introduced into a conventional system for device control. The system includes a first controller, a first optical head-end, a first optical terminal, and a first field device. The first controller communicates with the first field device through the first optical head-end. The first field device communicates with the first controller through the first optical terminal. The first optical head-end communicates with the first optical terminal through an optical signal. The optical head-end and optical terminal devices are introduced into the system for device control, so that the first controller and the first field device can communicate with each other through an optical signal. Because optical communication is featured in high bandwidth and low latency, communication latency between the first controller and the first field device can be greatly reduced. The communication between the first controller and the first field device can also satisfy requirements of services such as machine vision and motion control that have a high bandwidth requirement. The following describes the system through methods executed by devices in a specific service process.

In a downlink direction, the first optical head-end obtains a first primary station packet generated by the first controller. The first primary station packet includes a first primary station data unit. The first primary station data unit includes a destination identifier and first service data. The destination identifier included in the first primary station data unit is an identifier of the first field device. The first optical head-end constructs a first downlink transmission frame based on the first primary station data unit, and sends the first downlink transmission frame through an optical signal. The first downlink transmission frame includes the first primary station data unit and a header field corresponding to the first primary station data unit. The header field corresponding to the first primary station data unit includes an identifier of the first optical terminal or a broadcast optical terminal identifier. After receiving the first downlink transmission frame, the first optical terminal determines, based on the identifier of the first optical terminal or the broadcast optical terminal identifier included in the header field corresponding to the first primary station data unit, whether the first primary station data unit is a to-be-processed data unit. If the first primary station data unit is the to-be-processed data unit, the first optical terminal determines, based on the identifier of the first field device included in the first primary station data unit, that a destination recipient of the first primary station data unit is the first field device, and sends the first service data to the first field device, or operates or controls the first field device based on the first service data. It should be noted that the broadcast optical terminal identifier is a special optical terminal identifier, which has a value different from any optical terminal identifier, and identifies a broadcast signal. If a header field corresponding to a primary station data unit includes the broadcast optical terminal identifier, destination recipients of the primary station data unit are all optical terminals. When the header field corresponding to the first primary station data unit includes the broadcast optical terminal identifier, the first optical terminal is further configured to determine, based on the destination identifier included in the first primary station data unit, that the first primary station data unit is the to-be-processed data unit.

In an uplink direction, the first optical terminal obtains service data of the first field device, and encapsulates the service data of the first field device into a first uplink transmission subframe. The first uplink transmission subframe includes a header field and a first secondary station data unit. The header field in the first uplink transmission subframe includes the identifier of the first optical terminal. The first secondary station data unit includes the service data of the first field device and a source identifier. The source identifier in the first secondary station data unit is the identifier of the first field device, and identifies a sender of the first secondary station data unit. The first optical terminal sends the first uplink transmission subframe through an optical signal. The first optical head-end receives a first uplink transmission frame. The first uplink transmission frame includes the first uplink transmission subframe.

The system for device control based on optical communication provided in this application may include a plurality of field devices. The first controller may control the plurality of field devices through the first optical head-end. For example, the system further includes a second optical terminal and a second field device. The first controller communicates with the second field device through the first optical head-end. The second field device communicates with the first controller through the second optical terminal. The first optical head-end and the second optical terminal communicate with each other through an optical signal.

In the downlink direction, the first controller may include both a data unit whose destination recipient is the first field device and a data unit whose destination recipient is the second field device in a primary station packet to be delivered. For example, the first primary station packet further includes a second primary station data unit. The second primary station data unit includes a destination identifier and second service data. The destination identifier included in the second primary station data unit is an identifier of the second field device. The first downlink transmission frame constructed by the first optical head-end further includes content of the second primary station data unit. For example, the first downlink transmission frame further includes the second primary station data unit and a header field corresponding to the second primary station data unit. The header field corresponding to the second primary station data unit includes an identifier of the second optical terminal or the broadcast optical terminal identifier. The second optical terminal receives the first downlink transmission frame, and determines, based on the identifier of the second optical terminal or the broadcast optical terminal identifier included in the header field corresponding to the second primary station data unit, that the second primary station data unit included in a second downlink transmission subframe is a to-be-processed data unit. The second optical terminal further sends the second service data to the second field device based on the identifier of the second field device included in the second primary station data unit, or operates or controls the second field device based on the second service data. It should be noted that in the downlink transmission frame, the second primary station data unit and the first primary station data unit may correspond to different header fields, or may correspond to a same header field. When the second primary station data unit and the first primary station data unit correspond to a same header field, the header field includes the broadcast optical terminal identifier. Because the broadcast optical terminal identifier cannot identify a specific optical terminal, the first optical terminal and the second optical terminal cannot determine, based on the broadcast optical terminal identifier included in the header field, whether the first primary station data unit and the second primary station data unit are to-be-processed data units. In this case, the first optical terminal needs to further parse the first primary station data unit, and determine, based on whether the field device identified by the destination identifier included in the first primary station data unit is a field device connected to the first optical terminal, so as to determine whether to control the connected field device based on the first primary station data unit. The second optical terminal needs to further parse the second primary station data unit, and determine, based on whether the field device identified by the destination identifier included in the second primary station data unit is a field device connected to the second optical terminal, so as to determine whether to control the connected field device based on the second primary station data unit. The first optical head-end parses and processes a packet sent by the first controller, and encapsulates one or more primary station data units in the packet that include the service data into a downlink transmission frame suitable for transmission over an optical channel. Because an optical communication network formed by the optical head-end and a plurality of optical terminals is a point-to-multipoint optical communication network, transmission of a downlink transmission frame between the first optical head-end and each optical terminal does not require use of another optical terminal or field device for forwarding, thereby reducing transmission latency and improving communication efficiency.

In the uplink direction, the second optical terminal obtains service data of the second field device, and encapsulates the service data of the second field device into a second uplink transmission subframe. The second uplink transmission subframe includes a header field and a second secondary station data unit. The header field in the second uplink transmission subframe includes the identifier of the second optical terminal. The second secondary station data unit includes the service data of the second field device and a source identifier. The source identifier in the second secondary station data unit is the identifier of the second field device. The second optical terminal sends the second uplink transmission subframe through an optical signal. The first uplink transmission frame received by the first optical head-end further includes the second uplink transmission subframe.

The first optical head-end forwards data based on a destination identifier included in a data unit. For example, when the destination identifier included in the first secondary station data unit is an identifier of the first controller, the first optical head-end sends the first secondary station data unit to the first controller. When the destination identifier included in the first secondary station data unit is the identifier of the second field device, the first optical head-end constructs a second downlink transmission frame based on the first secondary station data unit, and sends, through the second downlink transmission frame, the first secondary station data unit to the second optical terminal corresponding to the second field device. In this way, a field device can communicate with a controller through an optical terminal, different field devices can communicate based on optical transmission, and low-latency and high-bandwidth communication can be achieved between field devices.

The system for device control based on optical communication provided in this application may include a plurality of controllers. For example, the system further includes a second controller, a second optical head-end, a third optical terminal, and a third field device. The second controller communicates with the third field device through the second optical head-end. The third field device communicates with the second controller through the third optical terminal. The second optical head-end and the third optical terminal communicate with each other through an optical signal.

The first controller and the second controller may communicate with each other through an optical head-end. The first optical head-end receives a second primary station packet sent by the first controller. The second primary station packet includes a third primary station data unit. The third primary station data unit includes a destination identifier and third service data. The destination identifier included in the third primary station data unit is an identifier of the second controller. The first optical head-end determines, based on the destination identifier in the third primary station data unit, that a destination recipient of the third primary station data unit is the second controller, further determines a MAC address of the second optical head-end corresponding to the second controller, and sends the third primary station data unit to the second optical head-end based on the MAC address of the second optical head-end. After receiving the third primary station data unit, the second optical head-end sends the third primary station data unit to the second controller based on the destination identifier in the third primary station data unit. It can be learned that, in the system provided in this application, different controllers can also communicate with each other through an optical head-end.

Not only the controllers can communicate with each other, but also field devices controlled by the different controllers can communicate with each other. In a possible implementation, the first optical terminal encapsulates the service data of the first field device into a third uplink transmission subframe. The third uplink transmission subframe includes a header field and a third secondary station data unit. The header field in the third uplink transmission subframe includes the identifier of the first optical terminal. The third secondary station data unit includes the service data of the first field device, a source identifier, and a destination identifier. The source identifier in the third secondary station data unit is the identifier of the first field device. The destination identifier included in the third secondary station data unit is an identifier of the third field device. The first optical terminal sends the third uplink transmission subframe to the first optical head-end through an optical signal. The first optical head-end receives the third uplink transmission subframe, determines, based on the destination identifier included in the third secondary station data unit, the MAC address of the second optical head-end corresponding to the second controller, and sends the third secondary station data unit to the second optical head-end based on the MAC address of the second optical head-end. The second optical head-end receives the third secondary station data unit, constructs a third downlink transmission frame based on the third secondary station data unit, and sends the third downlink transmission frame through an optical signal. The third downlink transmission frame includes the third secondary station data unit and a header field corresponding to the third secondary station data unit. The header field corresponding to the third secondary station data unit includes an identifier of the third optical terminal or the broadcast optical terminal identifier. The third optical terminal receives the third downlink transmission frame, and determines, based on the identifier of the third optical terminal or the broadcast optical terminal identifier included in the header field corresponding to the third secondary station data unit, that the third secondary station data unit is a to-be-processed data unit. The third optical terminal further sends the service data of the first field device to the third field device based on the identifier of the third field device included in the third secondary station data unit.

In the system provided in this application, an optical head-end not only can send, to any field device through an optical signal, service data or a control instruction sent by a controller to the field device, but also can send, to all field devices in a broadcast manner, service data or a control instruction sent by the controller to all the field devices. For example, the first controller controls N field devices. N is an integer greater than or equal to 1. The first optical head-end receives a third primary station packet sent by the first controller. The third primary station packet includes a fourth primary station data unit. The fourth primary station data unit includes a destination identifier and fourth service data. The destination identifier included in the fourth primary station data unit is a broadcast secondary station identifier. The broadcast secondary station identifier is different from any secondary station identifier, and indicates that the primary station data unit is to-be-broadcast data. The first optical head-end constructs a fourth downlink transmission frame based on the fourth primary station data unit, and sends the fourth downlink transmission frame through an optical signal. The fourth downlink transmission frame includes a header field and the fourth primary station data unit. The header field includes the broadcast optical terminal identifier. A $J^{th}$ optical terminal receives the fourth downlink transmission frame, and determines, based on the broadcast optical terminal identifier included in the header field in the fourth downlink transmission frame, that the fourth primary station data unit is a to-be-processed data unit. The $J^{th}$ optical terminal is an optical terminal corresponding to any one of the N field devices. The $J^{th}$ optical terminal sends, based on the broadcast secondary station identifier included in the fourth primary station data unit, the fourth service data included in the fourth primary station data unit to the field device corresponding to the $J^{th}$ optical terminal.

In a possible implementation, communication between the optical head-ends and the optical terminals is based on any PON protocol, an identifier of any optical head-end and an identifier of any optical terminal each are a passive optical network PON identifier, and a type of the PON identifier includes but is not limited to a gigabit-capable passive optical network encapsulation mode GEM port identifier and an Ethernet passive optical network EPON logical link identifier LLID.

In a possible implementation, a packet transmitted between the first controller and the first optical head-end is an Ethernet packet. The Ethernet packet further includes at least one of the following fields: a destination MAC address, a source MAC address, an Ethernet type, a timestamp, and a frame check sequence. The destination MAC address is a MAC address of the first optical head-end, and the source MAC address is a MAC address of the first controller.

In a possible implementation, any downlink transmission frame and any uplink transmission frame are in a GEM frame format, and a header field included in any downlink transmission frame and a header field included in any uplink transmission frame each are a GEM frame header field.

In a possible implementation, any primary station data unit and any secondary station data unit each further include at least one of the following fields: a data type, an operation type, a secondary station operation address offset, a payload length, a packet sequence number, a priority, a last packet data unit indication, a secondary station event, a response error code, and the like. The first optical terminal sends, to the first field device, the operation type and the secondary station operation address offset that are included in the first primary station data unit, or operates or controls the first field device based on the operation type and the secondary station operation address offset. In a possible implementation, a data type indicated by the data type field includes any one of the following data types: periodic real-time data, random access data, management data, and security data. When the data type indicated by the data type field is the periodic real-time data or the random access data, a command type indicated by the operation type field includes any one of the following types: a read operation, a write operation, a read/write operation, a broadcast write operation, and a loopback test. When the data type indicated by the data type field is the management data, a command type indicated by the operation type field includes any one of the following types: a read operation, a read response operation, a set operation, and a set response operation.

According to a second aspect, this application provides a method for device control based on optical communication. The method is performed by a controller, an optical head-end, an optical terminal, and a field device in cooperation.

For details of the method performed by the devices, refer to the description of the first aspect. Details are not described herein again.

According to a third aspect, an optical head-end is provided. The optical head-end includes at least one unit. The at least one unit is configured to implement the method according to the first aspect or any one of the optional implementations of the first aspect. In a possible implementation, a unit in the optical head-end is implemented through software, and the unit in the optical head-end is a program module. In a possible implementation, a unit in the optical head-end is implemented through hardware or firmware. In a possible implementation, the optical head-end includes a head-end service module, a head-end Ethernet module, a head-end point-to-multipoint module, and a head-end optical module, and optionally, may further include a controller module. The head-end service module is configured to identify a service data flow direction based on a destination identifier included in a data unit, and forward the data unit to the controller, the head-end Ethernet module, or the head-end point-to-multipoint module. The head-end Ethernet module is configured to provide an Ethernet interface, such as FE, GE, or 10GE, to receive and send Ethernet packets. The head-end point-to-multipoint module is configured to receive the data unit from the head-end service module, encapsulate the data unit into a downlink transmission frame suitable for transmission in a point-to-multipoint optical communication network, and send the downlink transmission frame through the head-end optical module. The head-end optical module is configured to provide an optical communication interface to send and receive optical signals. For specific details of the optical head-end provided in the third aspect, refer to the first aspect. Details are not described herein again.

According to a fourth aspect, an optical terminal is provided. The optical terminal includes at least one unit. The at least one unit is configured to implement the method according to the second aspect or any one of the optional implementations of the second aspect. In a possible implementation, a unit in the optical terminal is implemented through software, and the unit in the optical terminal is a program module. In a possible implementation, a unit in the optical terminal is implemented through hardware or firmware. In a possible implementation, the optical terminal includes a terminal optical module, a terminal point-to-multipoint module, and a terminal service module, and optionally, may further include a device control module. The terminal optical module is configured to provide an optical communication interface to send and receive optical signals. The optical signal may be of a single wavelength or a multiwavelength. The terminal point-to-multipoint module is configured to receive a downlink transmission frame in a downlink direction, parse the downlink transmission frame to obtain a data unit, and send the data unit to the terminal service module. The terminal point-to-multipoint module is configured to receive a secondary station data unit from the terminal service module in an uplink direction, encapsulate the secondary station data unit into an uplink transmission frame, and send the uplink transmission frame to an optical head-end through the terminal optical module. The terminal service module is further configured to parse the data unit in the downlink direction, and send service data in the data unit to the device control module or a field device. The terminal service module may further determine, based on a destination identifier carried in the data unit, whether the destination identifier is an identifier of a field device connected to the optical terminal, to determine whether the data unit needs to be processed. The terminal service module is further configured to receive service data from the device control module or the field device in the uplink direction, encapsulate the service data into a data unit, and send the data unit to the terminal point-to-multipoint module. For specific details of the optical terminal provided in the fourth aspect, refer to the first aspect. Details are not described herein again.

According to a fifth aspect, another optical head-end is provided. The optical head-end includes a processor and a transceiver. The processor is configured to execute instructions, to enable the optical head-end to perform the method according to the first aspect or the second aspect. The transceiver is configured to send and receive signals or data. For specific details of the optical head-end provided in the fifth aspect, refer to the first aspect. Details are not described herein again.

According to a sixth aspect, another optical terminal is provided. The optical terminal includes a processor and a transceiver. The processor is configured to execute instructions, to enable the optical terminal to perform the method according to the first aspect or the second aspect. The transceiver is configured to send and receive signals or data. For specific details of the optical terminal provided in the sixth aspect, refer to the first aspect. Details are not described herein again.

According to a seventh aspect, a computer-readable storage medium is provided. The storage medium stores at least one instruction. When the at least one instruction is run on a computer, the computer is enabled to perform the method according to the first aspect.

According to an eighth aspect, a computer program product is provided. The computer program product includes one or more computer program instructions. When the one or more computer program instructions are loaded and run by a computer, the computer is enabled to perform the method according to the first aspect.

According to a tenth aspect, a chip is provided, including a memory and a processor. The memory is configured to store computer instructions. The processor is configured to invoke and run the computer instructions from the memory, to perform the method according to the first aspect or any one of the possible implementations of the first aspect.

DETAILED DESCRIPTION OF ILLUSTRATIVE
EMBODIMENTS

To make the objectives, technical solutions, and advantages of this application clearer, the following further describes implementations of this application in detail with reference to the accompanying drawings.

Figure 1:
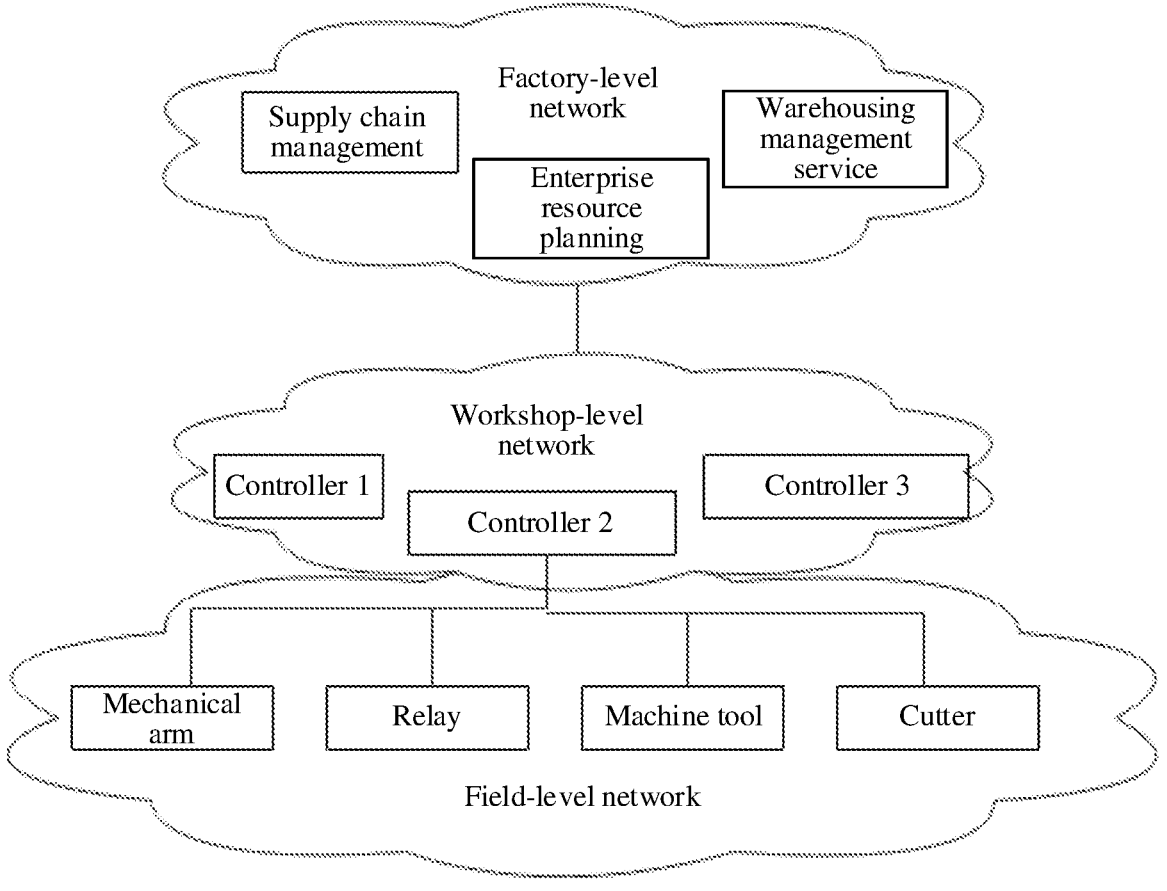
FIG. 1 is a schematic diagram of an architecture of an industrial manufacturing network.

As shown in FIG. 1, an industrial manufacturing network in a factory may be divided into three levels: a factory-level network, a workshop-level network, and a field-level network. The factory-level network is used for data communication between a supply chain management system, an enterprise resource planning system, a warehousing management system, and other systems of the factory. The workshop-level network is used for communication between a plurality of controllers in one or more workshops. The field-level network is used at a production site to provide communication between field devices and between a field device and a controller. In the field-level network, a typical form of the controller is a programmable logic controller (PLC). Alternatively, the controller is a hardware device having a computing processing capability other than the PLC, for example, a motion controller. The controller may also be referred to as a primary station or a head-end. The field device includes a mechanical arm, a relay, a machine tool, a cutter, and the like, and may also be referred to as a secondary station or a terminal. Currently, there are a variety of field bus technologies used in the field-level network, such as EtherCAT and POWERLINK. However, POWERLINK has large latency that is approximately at a millisecond ms level. EtherCAT implements packet forwarding based on hardware, and a time for an EtherCAT packet to pass through each secondary station is short. However, because a packet sent by a primary station needs to pass through all secondary station nodes, communication between the primary station and the secondary station still suffers from large communication latency when there are a large quantity of secondary station nodes. With development of the manufacturing industry, a controller needs to perform more precise, real-time, and complex control on a field device. Therefore, a field bus technology with low latency and high bandwidth is needed.

Figure 2:
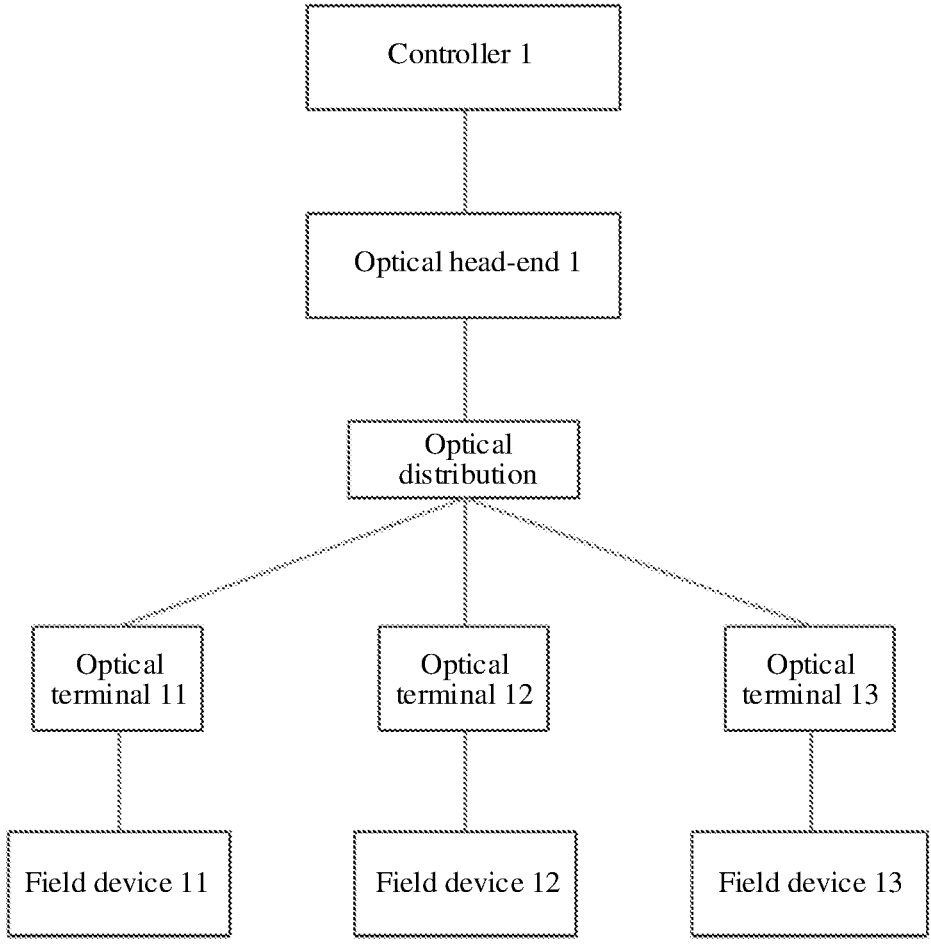
FIG. 2 is a schematic diagram of an architecture of a system for device control based on optical communication according to an embodiment of this application.

As shown in FIG. 2, the present invention provides a system for device control based on optical communication or a field bus architecture. The system for device control shown in FIG. 2 includes a controller 1, field devices (for example, a field device 11, a field device 12, and a field device 13 shown in the figure), an optical head-end 1 corresponding to the controller 1, and optical terminals (for example, an optical terminal 11, an optical terminal 12, and an optical terminal 13 shown in the figure) corresponding to the field devices. The optical head-end and the optical terminals perform optical communication through an optical distribution network. The optical terminals and the field devices may be in a one-to-one relationship, or may be in a one-to-many relationship, that is, one optical terminal corresponds to a plurality of field devices. The optical head-end needs to record and manage the correspondence between the optical terminals and the field devices. The optical head-end 1, a plurality of optical terminals, and the optical distribution network form a point-to-multipoint optical communication network. The optical distribution network may include an optical fiber, an optical coupler, an optical splitter, a splitter, or other devices. A device in the optical distribution network is a passive optical device. To be specific, the device in the optical distribution network does not require a power supply when transmitting and distributing an optical signal. Using an optical splitter (Splitter) as an example, the optical splitter may be connected to the optical head-end 1 through a feeder fiber, and connected to the plurality of optical terminals through a plurality of distribution fibers, to achieve point-to-multipoint connection between the one optical head-end and the plurality of optical terminals to implement a point-to-multipoint optical splitting or combining function. The splitter may be a one-stage splitter or a multi-stage splitter, and the optical splitter may also be an even fiber or an uneven fiber. The optical distribution network splits a downlink optical signal from the optical head-end into a plurality of optical signals, and distributes the plurality of optical signals to the optical terminals; and combines uplink optical signals from the plurality of optical terminals into one optical signal, and sends the one optical signal to the optical head-end. The uplink optical signals sent by the optical terminals and each carrying a secondary station data unit are combined into one optical signal through the optical distribution network, and sent to the optical head-end. In this application, the term uplink or downlink indicates a signal flow direction. Uplink means to a direction from an optical terminal to an optical head-end, and downlink means a direction from an optical head-end to an optical terminal. An uplink or downlink optical signal includes service data. The service data includes but is not limited to a signal or an instruction used for controlling a field device, data that is queried, acquired, or reported by a field device, and the like. The service data is encapsulated in a data unit. For ease of description and understanding, in this application, a data unit that encapsulates service data sent by a controller is referred to as a primary station data unit, and a data unit that encapsulates service data sent by a field device is referred to as a secondary station data unit. It should also be noted that names of the devices in the system shown in FIG. 2 are merely examples. In a specific implementation, the names of the devices may also be other names. This is not specifically limited in this application. For example, an optical head-end may also be referred to as an optical controller, an optical primary station, an optical communication device, or the like. An optical terminal may also be referred to as an optical secondary station, an optical communication device, or the like.

In a possible implementation, the point-to-multipoint optical communication network may be a passive optical network (PON), and includes a next-generation PON (NG- PON), NG-PON1, NG-PON2, gigabit-capable PON (GPON), 10-gigabit-per-second PON (10-gigabit-per-second PON, XG-PON), 10-gigabit-capable symmetric passive optical network (XGS-PON), Ethernet PON (Ethernet PON, EPON), 10-gigabit-per-second EPON (10G-EPON), next-generation EPON (NG-EPON), wavelength-division multiplexing (WDM) PON, time- and wavelength-division multiplexing (TWDM) PON, point-to-point (P2P) WDM PON (P2P-WDM PON), asynchronous transfer mode PON (APON), broadband PON (BPON), 25-gigabit-per-second PON (25G-PON), so-gigabit-per-second PON (soG-PON), mo-gigabit-per-second PON (100G-PON), 25-gigabit-per-second EPON (25G-EPON), so-gigabit-per-second EPON (soG-EPON), mo-gigabit-per-second EPON (100G-EPON), GPONs and EPONs having other rates, and the like. When the point-to-multipoint optical communication network is a PON network, a function of the optical head-end in FIG. 2 may be specifically implemented by an optical line terminal (OLT), and a function of the optical terminal may be specifically implemented by an optical network unit (ONU) or an optical network terminal (ONT). In other words, the OLT may implement the function of the optical head-end, and the ONT or the ONU may implement the function of the optical terminal. The optical head-end and the optical terminal communicate with each other using any PON communication mechanism and protocol. For example, the optical head-end allocates different uplink slots to the optical terminals, and each optical terminal sends uplink data or an uplink transmission frame in the uplink slot allocated by the optical head-end to the optical terminal. This ensures that the uplink data sent by the optical terminals does not conflict or interfere with each other during transmission. A specific PON communication mechanism and protocol are not described in detail herein.

The controller 1 and the optical head-end 1 may be deployed separately, or may be deployed in an integrated manner. When the controller 1 and the optical head-end 1 are deployed separately, an interface between the controller 1 and the optical head-end 1 may be one of an Ethernet interface (FE, GE, or 10GE), a PCIE interface, or another interface. When the optical head-end 1 and the controller 1 are deployed in an integrated manner, the interface between the optical head-end 1 and the controller 1 is a software transceiver interface in a same device. The optical terminal and the field device may be deployed separately, or may be deployed in an integrated manner. Using the optical terminal 11 and the field device 11 as an example, when the optical terminal 11 and the field device 11 are deployed separately, an interface between the optical terminal 11 and the field device 11 may be one of an Ethernet interface (FE, GE, or 10GE), an SPI interface, or a servo motor monitoring and driving interface (AD, GPIO, RS422, PWM control, or the like). When the optical terminal 11 and the field device 11 are deployed in an integrated manner, the interface between the optical terminal 11 and the field device 11 is a software transceiver interface in a same device.

Figure 3:
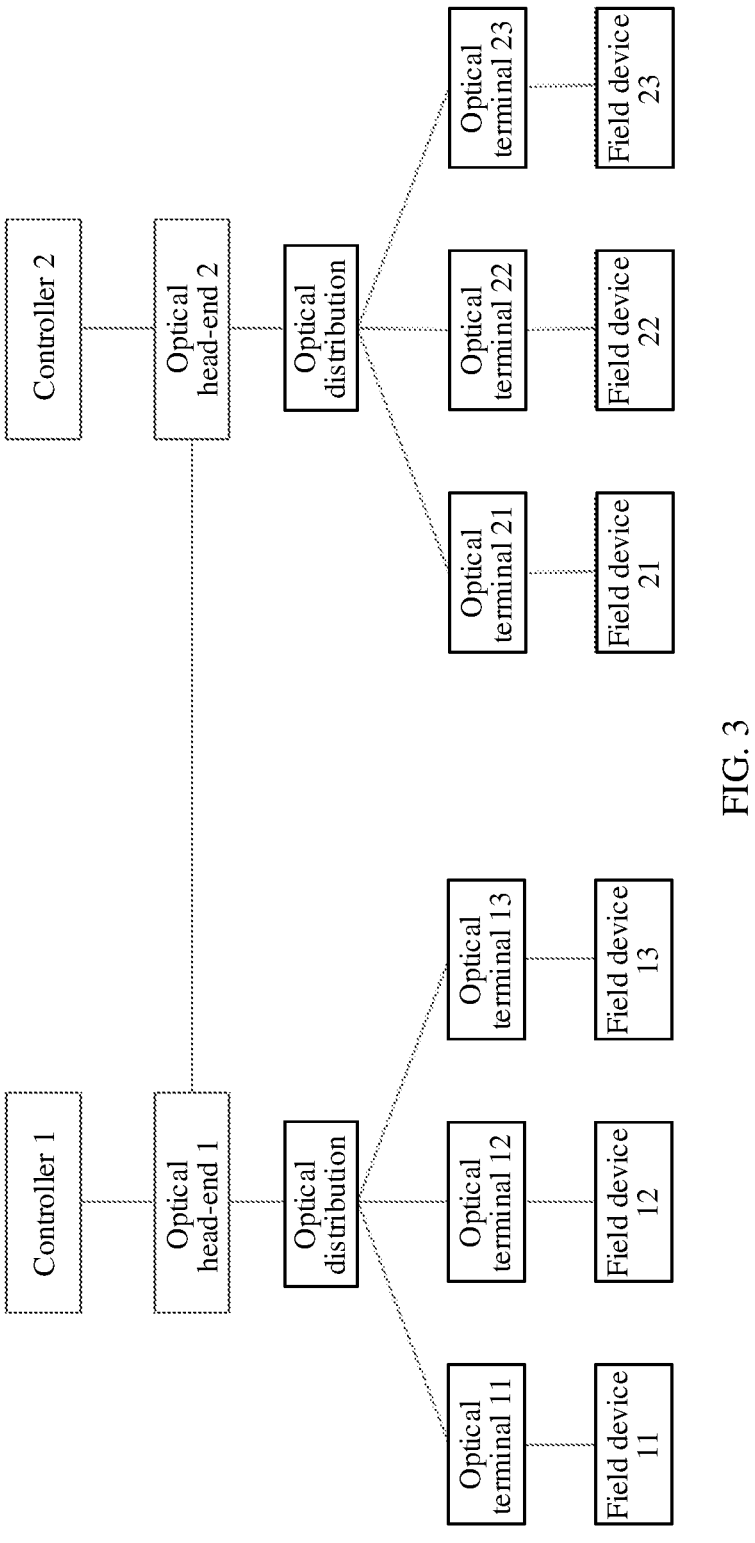
FIG. 3 is a schematic diagram of an architecture of another system for device control based on optical communication according to an embodiment of this application.

The system for device control shown in FIG. 2 may further include a plurality of groups of controllers and corresponding field devices. As shown in FIG. 3, the system includes two controllers, namely, a controller 1 and a controller 2, each of which controls one or more field devices. In this case, the controller 1 and the controller 2 may communicate through an interface between an optical head-end 1 and an optical head-end 2. Through the interface between the optical head-end 1 and the optical head-end 2, a field device controlled by the controller 1 may also communicate with a field device controlled by the controller 2.

The following separately describes the devices or apparatuses shown in FIG. 2 or FIG. 3.

Figure 4:
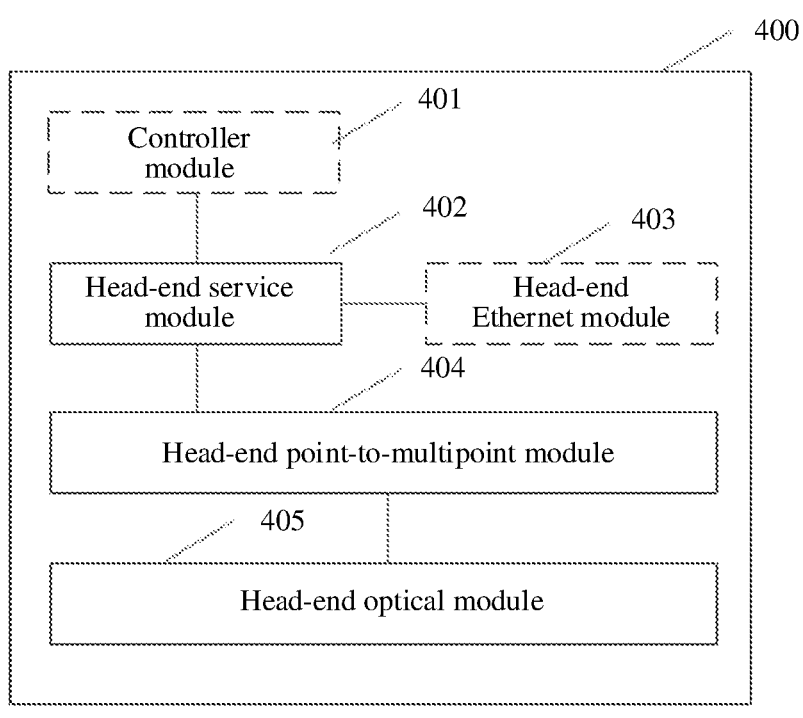
FIG. 4 is a schematic structural diagram of logical functions of an optical head-end according to an embodiment of this application.

An optical head-end mainly sends and receives service data in a point-to-multipoint optical communication network. For example, FIG. 4 is a schematic structural diagram of possible logical functions of an optical head-end according to this application. An optical head-end 400 may include the following logical function modules: a controller module 401, a head-end service module 402, a head-end Ethernet module 403, a head-end point-to-multipoint module 404, and a head-end optical module 405.

Controller module 401: As described above, the controller and the optical head-end may be deployed in an integrated manner. In the case of integrated deployment, the optical head-end includes a controller module to implement logic control programming of a field device, and a computing capability of the field device may further be implemented in this module, to reduce performance requirements on hardware or software of the field device. It should be noted that the controller described in this application may be the controller module 401 deployed in an integrated manner with the optical head-end, or may be a controller deployed separately from the optical head-end.

Figure 6:
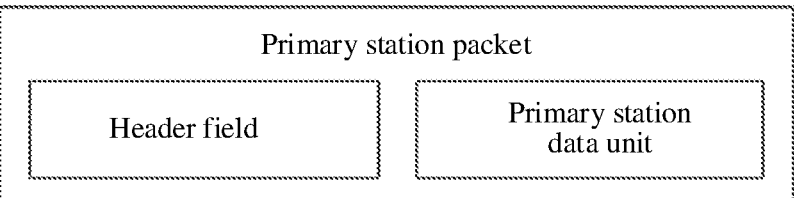
FIG. 6 is a schematic diagram of a structure of a primary station packet according to an embodiment of this application.

The head-end service module 402 is configured to identify a service data flow direction based on a destination identifier included in a data unit, and forward the data unit to the controller module 401 (or an external controller), the head-end Ethernet module 403, or the head-end point-to-multipoint module 404. Specifically, the head-end service module 402 is further configured to receive a packet sent by a controller, where the packet is also referred to as a primary station packet. As shown in FIG. 6, the primary station packet includes a header field and at least one primary station data unit; if a destination node identified by a destination identifier in a primary station data unit is a field device controlled by the controller, sends the primary station data unit to the head-end point-to-multipoint module 404; and if the destination node identified by the destination identifier in a primary station data unit is another controller or a field device controlled by another controller, send the primary station data unit to the head-end Ethernet module 403. The head-end service module 402 is further configured to: receive a secondary station data unit sent by the head-end point-to-multipoint module 404; if a destination node identified by a destination identifier in the secondary station data unit is a controller, send the secondary station data unit to the controller; and if the destination node identified by the destination identifier in the secondary station data unit is another controller or a field device controlled by another controller, send the secondary station data unit to the head-end Ethernet module 403. The head-end service module 402 is further configured to: receive a packet sent by the head-end Ethernet module 403; if a destination node identified by a destination identifier in a data unit in the packet is a controller, send the data unit to the controller; and if the destination node identified by the destination identifier in the data unit is a field device controlled by a controller, send the data unit to the head-end point-to-multipoint module 404. Optionally, when the packet sent by the controller carries a plurality of primary station data units, the head-end service module 402 further needs to record a sequence of the plurality of primary station data units based on a destination identifier included in each of the primary station data units. Subsequently, after receiving secondary station data units of field devices, the head-end service module 402 adjusts a sequence of a plurality of secondary station data units based on identifiers of the field devices and the sequence of the primary station data units, so that the sequence of the plurality of secondary station data units sent to the controller is consistent with the sequence of the plurality of primary station data units in the primary station packet.

The head-end Ethernet module 403 is configured to provide an Ethernet interface, such as FE, GE, or 10GE, to receive and send Ethernet packets.

Figure 7:
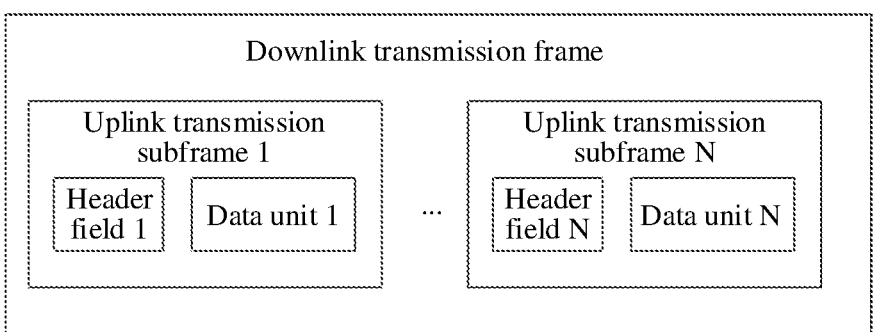
FIG. 7 is a schematic diagram of a structure of a downlink transmission frame according to an embodiment of this application.
Figure 8:
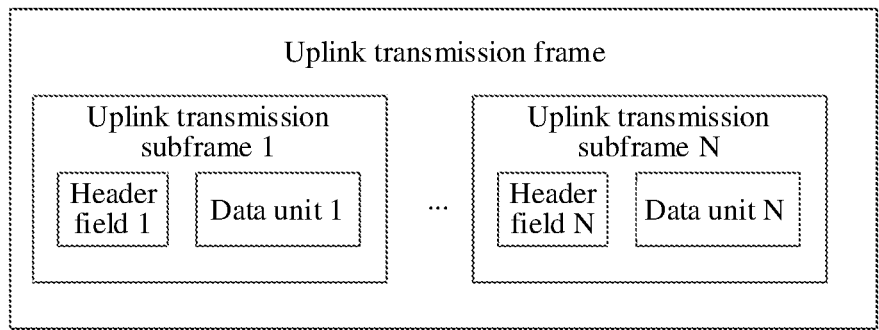
FIG. 8 is a schematic diagram of a structure of an uplink transmission frame according to an embodiment of this application.
Figure 9:
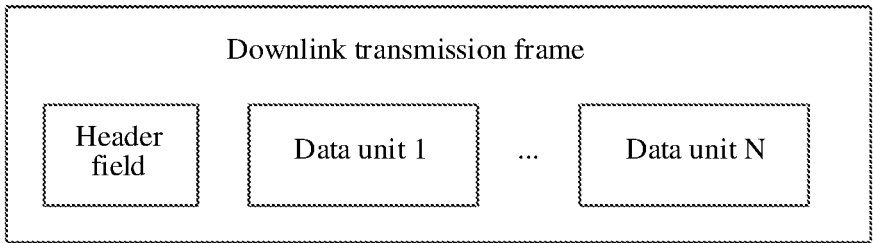
FIG. 9 is a schematic diagram of a structure of another downlink transmission frame according to an embodiment of this application.

The head-end point-to-multipoint module 404 is configured to receive the data unit from the head-end service module, encapsulate the data unit into a downlink transmission frame suitable for transmission in a point-to-multipoint optical communication network, and send the downlink transmission frame through the head-end optical module 405. The head-end point-to-multipoint module 404 is further configured to receive an uplink transmission frame from a field device, and sends a data unit in the uplink transmission frame to the head-end service module 402 for processing. In a possible implementation, a downlink transmission frame includes at least one downlink transmission subframe, as shown in FIG. 7. The uplink transmission frame includes at least one uplink transmission subframe, as shown in FIG. 8. The downlink or uplink transmission subframe includes a header field and a data unit. The header field in the downlink transmission subframe includes a destination identifier, and a value of the destination identifier is an identifier of an optical terminal. The optical terminal determines, based on the identifier of the optical terminal in the header field, whether the data unit in the downlink transmission subframe needs to be processed. Frame formats of the downlink transmission subframe and the uplink transmission subframe are not limited. For example, a GPON encapsulation mode (GPON encapsulation mode/method, GEM) frame format based on any GPON protocol may be used. In another possible implementation, a downlink data frame includes a header field and a plurality of data units, as shown in FIG. 9. A value of a destination identifier included in the header field is a broadcast optical terminal identifier. The broadcast optical terminal identifier is a specific optical terminal identifier for use in a broadcast scenario. When the frame structure shown in FIG. 9 is used, each optical terminal cannot identify, based on the destination identifier in the header field, a data unit that needs to be processed, and needs to parse the data units one by one and determine, based on an identifier of a field device in each data unit, whether the data unit needs to be processed. Compared with the downlink transmission frame shown in FIG. 7, the downlink transmission frame shown in FIG. 9 has a simpler structure than that of the downlink transmission frame shown in FIG. 7, but has lower data security than that of the solution in FIG. 7.

The head-end optical module 405 is configured to provide an optical communication interface to send and receive optical signals. The optical signal may be of a single wavelength or a multiwavelength.

It should be noted that the foregoing division of the function modules of the optical head-end is only a possible implementation, and functions of the foregoing modules may alternatively be integrated or divided in other manners. For example, the head-end service module 402 and the head-end point-to-multipoint module 404 may be integrated into one function module.

Figure 5:
FIG. 5 is a schematic structural diagram of logical functions of an optical terminal according to an embodiment of this application.
Figure 5:
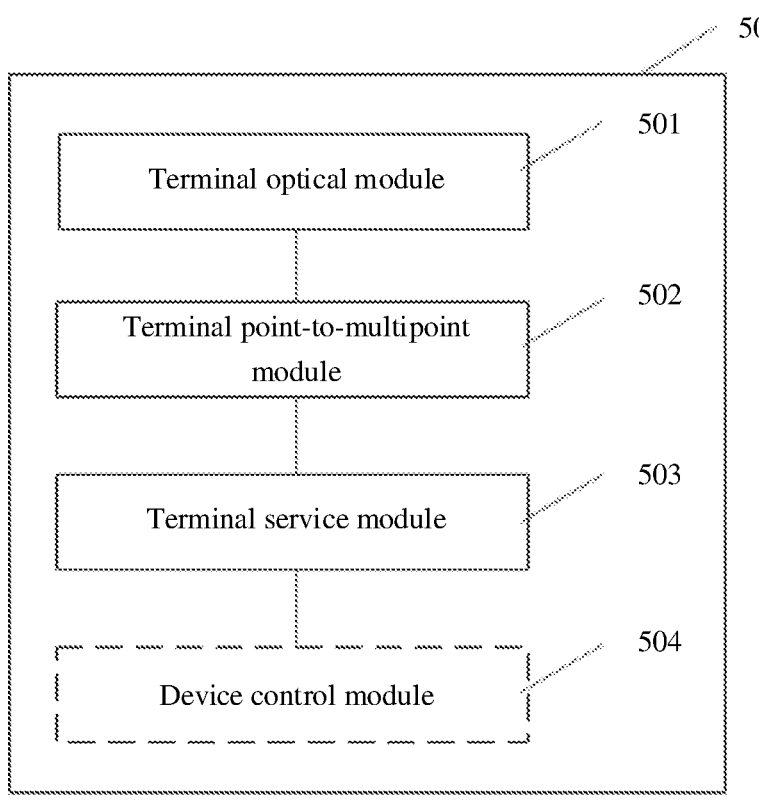

An optical terminal sends and receives service data in a point-to-multipoint optical communication network. The optical terminal extracts a to-be-processed downlink transmission subframe from a received downlink optical signal, and sends service data carried in the downlink transmission subframe to a field device. The optical terminal receives service data sent by a field device, encapsulates the service data into an uplink transmission subframe, converts the uplink transmission subframe into an optical signal, and sends the optical signal to an optical head-end through the point-to-multipoint optical communication network. For example, FIG. 5 is a schematic structural diagram of possible logical functions of an optical terminal according to this application. An optical terminal 500 may include the following logical function modules: a terminal optical module 501, a terminal point-to-multipoint module 502, a terminal service module 503, and a device control module 504.

The terminal optical module 501 is configured to provide an optical communication interface to send and receive optical signals. The optical signal may be of a single wavelength or a multiwavelength.

The terminal point-to-multipoint module 502 is configured to receive a downlink transmission frame in a downlink direction, parse the downlink transmission frame to obtain a data unit, and send the data unit to the terminal service module 503. If the downlink transmission frame is in the encapsulation format shown in FIG. 7, the terminal point-to-multipoint module 502 checks whether an optical terminal identifier included in the header field of each downlink transmission subframe is an identifier of the optical terminal; if yes, sends the data unit included in the downlink transmission subframe to the terminal service module 503 for further processing; and if not, stops processing the downlink transmission subframe. If the downlink transmission frame is in the encapsulation format shown in FIG. 9, the terminal point-to-multipoint module 502 parses the data units one by one; determines whether a field device identifier carried in each data unit is an identifier of a field device connected to the optical terminal; if yes, sends the data unit to the terminal service module 503 for further processing; and if not, discards the data unit. In an uplink direction, the terminal point-to-multipoint module 502 is configured to receive a secondary station data unit from the terminal service module 503, encapsulate the secondary station data unit into an uplink transmission frame, and send the uplink transmission frame to an optical head-end through the terminal optical module 501. It should be noted that an uplink optical signal received by an optical head-end is an optical signal obtained through combination by an optical distribution network, and includes uplink signals of a plurality of optical terminals. Therefore, an uplink transmission frame in an uplink optical signal received by an optical head-end includes uplink transmission subframes sent by a plurality of optical terminals, and each uplink transmission subframe is an uplink transmission frame sent by one optical terminal.

The terminal service module 503 is configured to parse the data unit in the downlink direction, and send service data in the data unit to the device control module 504 or a field device. The terminal service module 503 may further determine, based on a destination identifier carried in the data unit, whether the destination identifier is an identifier of a field device connected to the optical terminal, to determine whether the data unit needs to be processed. The terminal service module 503 is further configured to receive service data from the device control module 504 or the field device in the uplink direction, encapsulate the service data into a data unit, and send the data unit to the terminal point-to-multipoint module 502. It should be noted that when the downlink transmission frame is in the encapsulation format shown in FIG. 9, because the terminal point-to-multipoint module 502 already parses the data unit, the terminal point-to-multipoint module 502 may directly send service data included in a downlink data unit to the device control module 504 or a field device.

Device control module 504: As described above, the optical terminal and the field device may be deployed in an integrated manner, or may be deployed separately. In the case of integrated deployment, the device control module 504 may be understood as a module for controlling the field device. It should be noted that the field device described in this application may be a field device that is deployed in an integrated manner with the optical terminal, or may be a field device that is deployed separately from the optical terminal.

It should be noted that the foregoing division of the function modules of the optical terminal is only a possible implementation, and functions of the foregoing modules may alternatively be integrated or divided in other manners. For example, the terminal service module 503 and the terminal point-to-multipoint module 502 may be integrated into one function module.

From the foregoing description of the system for device control shown in FIG. 2 and FIG. 3, it can be learned that because the controller communicates with the field device through a point-to-multipoint optical network formed by the optical head-end and the optical terminals, communication between the controller and any field device does not require use of another field device for forwarding, thereby greatly reducing communication latency. In addition, fiber optic communication can better meet requirements of future industrial control scenarios (such as motion control and machine vision) for high bandwidth. In addition, because optical communication is not easily affected by electromagnetic radiation, bit errors caused by the electromagnetic radiation can be avoided.

Figure 10:
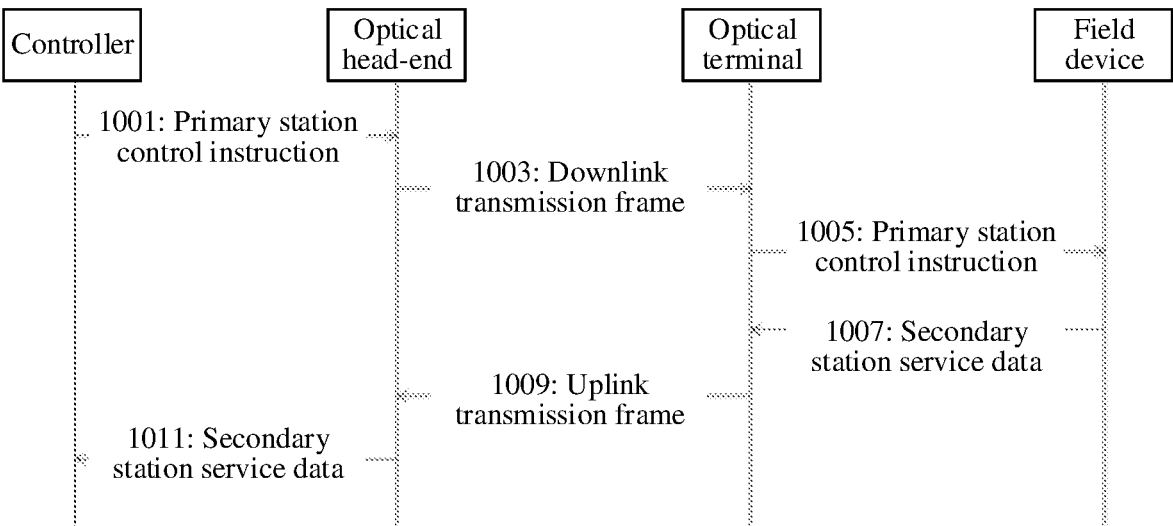
FIG. 10 is a schematic flowchart of a method for controlling a field device by a controller through an optical communication network according to an embodiment of this application.

The following describes a process of controlling a field device by a controller according to this application with reference to a method flowchart shown in FIG. 10. A method procedure shown in FIG. 10 is applicable to the system for device control shown in FIG. 2 and FIG. 3. For networking and connection relationships between a controller, an optical head-end, an optical terminal, and a field device in FIG. 10, refer to descriptions corresponding to FIG. 2 and FIG. 3. Details are not described herein again. It should also be noted that although FIG. 10 shows only one optical terminal and a field device connected to the optical terminal, there may be more than one optical terminal and field device connected to the optical head-end in practice. In FIG. 10, one optical terminal and one field device are used as an example to describe a method procedure performed by the optical terminal and the field device.

1001: The controller sends a control instruction for controlling the field device. The control instruction is encapsulated in the primary station packet shown in FIG. 6. The primary station packet may be specifically a packet in an Ethernet packet format. Table 1 lists fields that may be included in the primary station packet. The header field in FIG. 6 may include a DA field, an SA field, and an EtherType field in Table 1, and any primary station data unit in FIG. 6 corresponds to PDUn in Table 1.

TABLE 1

| Field name | Field description |
| --- | --- |
| Destination Address (DA)/Destination address | Destination address of a packet |

TABLE 1-continued

| Field name | Field description |
| --- | --- |
| Source Address (SA)/Source address | Source address from which the packet is sent |
| EtherType/Ethernet type | Ethernet type |
| PDUn/Data unit | Carrying service data |

The DA field identifies an address of a destination node of the packet. In the message in low, a value of this field may be a MAC address of the optical head-end. The SA field identifies an address of a source node of the packet. In the message in 1001, a value of this field may be a MAC address of the controller. The EtherType field identifies a type of an upper-layer protocol. The primary station packet includes at least one PDU. PDUn represents any one of the at least one PDU and is used for carrying service data. The PDU includes at least a source identifier, a destination identifier, and the service data. A possible PDU structure is shown in Table 2.

TABLE 2

| Bit offset | | | | | | | |
| --- | --- | --- | --- | --- | --- | --- | --- |
| 7 | 6 | 5 | 4 | 3 | 2 | 1 | 0 |
| Type/Data type | | | | cmd/Operation type | | | |
| Destination ID/Destination identifier | | | | | | | |
| SourceID/Source identifier | | | | | | | |
| offset1/Offset address 1 | | | | | | | |
| offset0/Offset address 0 | | | | len1/Payload length 1 | | | |
| len0/Payload length 0 | | | | | | | |
| payload/Payload | | | | | | | |

The destination identifier identifies a destination node identifier of the data unit. The source identifier identifies a source station identifier of the data unit. In the message in 1001, the destination node identifier in the PDU is an identifier of a field device (where the identifier of the field device may also be referred to as a secondary station identifier), and the source station identifier is an identifier of the controller (where the identifier of the controller may also be referred to as a primary station identifier). Content and a format of the service data are not limited in this application. The service data may be encapsulated in the payload field shown in Table 2. In addition to the payload field, one or more fields such as a data type field, an operation type field, and an offset address field may further be included. A data type that may be indicated by the data type field includes periodic real-time data, random access data, management data, security data, and the like. When the data type indicated by the data type field is the periodic real-time data or the random access data, a command type indicated by the operation type field may include a read operation, a write operation, a read/write operation, a broadcast write operation, a loopback test, and the like. When the data type indicated by the data type field is the management data, a command type indicated by the operation type field may include a read operation, a read response operation, a set operation, a set response operation, and the like. In Table 2, the offset address field occupies 12 bits, and the offset address field indicates a logical start offset address on which a secondary station needs to perform an operation. If all addresses need to be operated, the offset address may be set to 0. In addition to the fields shown in Table 2, the data unit may further include other fields, as shown in Table 3.

17

TABLE 3

| 7 6 5 4 | 3 | 2 | 1 | 0 |
|---|---|---|---|---|
| | | Bit bit offset | | |
| Type/Data type | cmd/Operation type | | | |
| Destination ID/Destination identifier | | | | |
| SourceID/Source identifier | | | | |
| offset1/Offset address 1 | | | | |
| offset0/Offset address 0 | len1/Payload length 1 | | | |
| len0/Payload length 0 | | | | |
| sn/Packet sequence number | | | | |
| pri/Packet priority | r/Reserved | eop_ind/ Last PDU indication | r/Reserved | r/Reserved r/Reserved |
| event/Event | | | | |
| err_code/Error code | | | | |
| payload/Payload | | | | |

The packet sequence number field is used for indicating a sequence number of a primary station packet sent by a primary station controller, and the secondary station carries a same sequence number value in a response message. In this way, after receiving service data of the secondary station, the primary station may learn, based on the packet sequence number, a primary station packet corresponding to the service data reported by the secondary station. The packet priority field is used for indicating a priority of the packet. The eop_ind field is used for indicating whether the PDU is a last PDU in the packet. The event field and the error code field are generally used by the secondary station to report a secondary station event and an error type to the primary station. In the primary station packet in 1001, the event field and the error code field in the PDU may be set to null.

1003: After receiving the primary station control instruction, the optical head-end determines, based on the secondary station identifier included in the PDU in the primary station packet, that the destination node of the PDU is the secondary station or the field device, then encapsulates one or more PDUs in the primary station packet into a downlink transmission frame suitable for transmission in a point-to-multipoint optical communication network, and sends the downlink transmission frame through an optical signal. In addition to the one or more PDUs, the downlink transmission frame further includes a header field part. The header field part includes an identifier of the optical terminal, to indicate an optical terminal that needs to receive and process each PDU. It should be noted that when the point-to-multipoint optical transmission network is a GPON network, the identifier of the optical terminal may be a GEM port identifier of the optical terminal. When the point-to-multipoint optical transmission network is an EPON network, the identifier of the optical terminal may be a logical link identifier LLID of the optical terminal. In a possible implementation, the optical head-end generates one header field part for each PDU, and each PDU and the header field part corresponding to the PDU form one downlink transmission subframe, as shown in FIG. 7. Assuming that a field device corresponding to a destination identifier or a secondary station identifier in a PDU is a field device 1, an identifier of an optical terminal included in a header field corresponding to the PDU is an identifier of the optical terminal 1. In another possible implementation, all the PDUs in the downlink transmission frame correspond to a same header field, as shown in FIG. 9. In this case, the identifier of the optical terminal included in the header field in the downlink transmission frame is no longer an identifier of a specific optical terminal, but is a broadcast optical terminal identifier, for example, a wildcard identifier or a preset value. The broadcast optical terminal identifier is used for indicating each optical terminal to parse all the PDUs, and determine, based on the secondary station identifiers included in the PDUs and an identifier of a field device connected to the optical terminal, which PDU should be used for controlling a connected secondary station. Optionally, the optical head-end may further record, based on the destination identifiers in the PDUs, a sequence of a plurality of PDUs included in the primary station packet; and subsequently after receiving secondary station data units of field devices, adjust a sequence of a plurality of secondary station data units based on identifiers of the field devices and the sequence of the plurality of PDUs included in the primary station packet, so that the sequence of the plurality of secondary station data units sent to the controller is consistent with the sequence of the plurality of primary station data units in the primary station packet.

1005: The optical terminal receives the downlink transmission frame sent by the optical head-end, parses the downlink transmission frame, and sends the primary station control instruction to the corresponding field device. When a format of the downlink transmission frame is the format shown in FIG. 7, the optical terminal parses a header field of each downlink transmission subframe; and if a destination identifier included in the header field in the downlink transmission subframe is an identifier corresponding to the optical terminal, continues to process the data unit in the downlink transmission subframe. When the format of the downlink transmission frame is the format shown in FIG. 9, the optical terminal parses the PDUs one by one; determines whether the secondary station identifier included in each PDU is an identifier of a field device connected to the optical terminal; and if yes, continues to process the PDU. For the PDU that needs to be further processed, the optical terminal parses out service data in the PDU, and sends the service data to the field device corresponding to the secondary station identifier. For content that may be included in the service data, refer to the description of Table 2 or Table 3.

1007: After performing an operation based on the primary station control instruction, the field device returns secondary station service data to the optical terminal. The secondary station service data may be content of the payload part in Table 2 or Table 3, or may further include content of other fields in Table 2 and Table 3, such as the secondary station event field and the error code field.

1009: The optical terminal receives the secondary station service data, encapsulates the secondary station service data into the PDU format shown in Table 2 or Table 3, further encapsulates the secondary station service data in the PDU format into an uplink transmission frame suitable for transmission in the point-to-multipoint optical transmission network, and then sends the uplink transmission frame through an optical signal. A frame format of the uplink transmission frame may be a GPON encapsulation mode (GPON encapsulation mode/method, GEM) frame format of any GPON protocol. In a possible implementation, the uplink transmission frame is encapsulated into the format of the uplink transmission frame shown in FIG. 8, and one header field is generated for each PDU. The header field corresponding to the PDU includes the identifier of the optical terminal, to identify an optical terminal from which the PDU comes. It should be noted that when the point-to-multipoint optical transmission network is a GPON network, the identifier of the optical terminal may be a GEM port identifier of the optical terminal. When the point-to-multipoint optical transmission network is an EPON network, the identifier of the optical terminal may be a logical link identifier LLID of the optical terminal. The destination identifier in the PDU is an identifier of a control device, and the source identifier in the PDU is an identifier of a field device corresponding to the service data in the PDU. If the PDU included in the downlink transmission frame in 1003 carries an SN field, the PDU included in the uplink transmission frame also carries an SN field, and the SN field has the same value as the SN field in the PDU included in the downlink transmission frame, and indicates a downlink control instruction corresponding to the service data carried in the PDU in the uplink transmission frame. It should be noted that the uplink transmission frame sent by each secondary station is combined by an optical distribution network into one or more uplink transmission subframes in the uplink transmission frame received by the optical head-end.

111: The optical head-end receives the uplink transmission frame, parses the one or more uplink transmission subframes included in the uplink transmission frame, and obtains secondary station data units PDUs. The optical head-end sends the PDUs to the controller based on the destination identifiers included in the PDUs. A packet format of the secondary station data unit sent by the optical head-end to the controller may be the packet format shown in Table 1. If the optical head-end records, in step 1003, the sequence of the primary station data units sent by the controller, the optical head-end may further sort the secondary station data units based on source identifiers included in the secondary station data units, so that a sequence of the secondary station data units reported to the controller is consistent with the sequence of the primary station data units delivered by the controller. After receiving the secondary station service data, the controller parses the secondary station service data, and performs subsequent processing.

The foregoing describes a method procedure of controlling a secondary station by a controller through a point-to-multipoint optical communication network. It should be noted that the data formats and field names shown in Table 1 to Table 3 are merely examples, and the field names, lengths of the fields, a relationship between relative positions of the fields, and the like may be changed depending on an actual requirement. For example, in Table 2 and Table 3, fields such as the data type field, the operation type field, and the offset address field may alternatively be encapsulated in the payload field.

Figure 11:
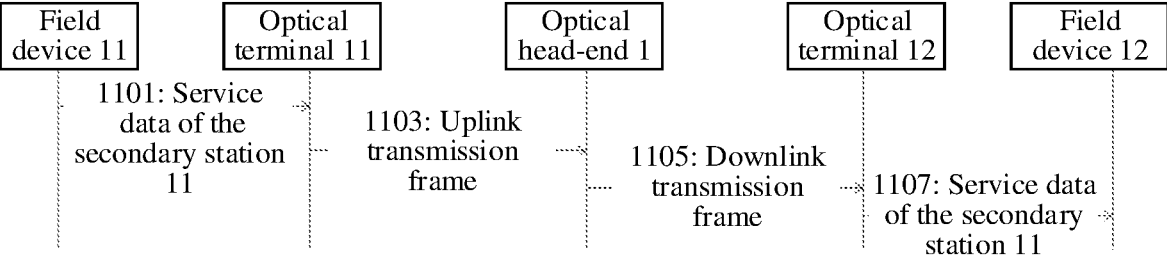
FIG. 11 is a schematic flowchart of a method for communication between field devices through an optical communication network according to an embodiment of this application.

In the system for device control based on optical communication provided in this application, a controller may communicate, through a point-to-multipoint optical communication network, with a secondary station controlled or managed by the controller, and a plurality of secondary stations managed by a same controller may also communicate with each other. As shown in FIG. 11, the field device 11 may further send data to the field device 12 through the point-to-multipoint optical communication network.

1101: The field device 11 sends service data to the optical terminal 11.

1103: The optical terminal 11 encapsulates the service data of the secondary station 11 into the PDU format shown in FIG. 2 or FIG. 3, further encapsulates the service data in the PDU format into an uplink transmission frame suitable for transmission in the point-to-multipoint optical transmission network, and then sends the uplink transmission frame through an optical signal. In the PDU that encapsulates the service data of the secondary station 11, the destination identifier is an identifier of the field device 12. For a format of the uplink transmission frame, refer to the description in the embodiment shown in FIG. 10. Details are not described herein again.

1105: The optical head-end receives the uplink transmission frame, determines, based on the destination identifier in the PDU, that a destination recipient of the PDU is the field device 12, and encapsulates the PDU into a downlink transmission frame shown in FIG. 8 or FIG. 9. The header field in the downlink transmission frame includes the identifier of the optical terminal 12. For a format of the downlink transmission frame, refer to the description in the embodiment shown in FIG. 10. Details are not described herein again.

1107: After receiving the downlink transmission frame, the optical terminal 12 parses the downlink transmission frame, and sends service data included in the downlink transmission frame to the field device 12. For details of the method performed by the optical terminal 12, refer to step 1005. Details are not described herein again.

When there are a plurality of controllers, as shown in FIG. 3, the plurality of controllers may further communicate with each other through head-end Ethernet modules of optical head-ends. For example, the controller 1 may send a packet to the controller 2 through the optical head-end 1. In this case, a destination node identified by a destination identifier in a primary station data unit sent by the controller 1 is the controller 2. The optical head-end 1 determines that the destination node identified by the destination identifier is the controller 2, and sends the primary station data unit to the optical head-end 2 through an Ethernet interface. The optical head-end 2 sends the received data unit, that is, the primary station data unit sent by the controller 1, to the controller 2 based on the destination identifier in the data unit.

Figure 12:
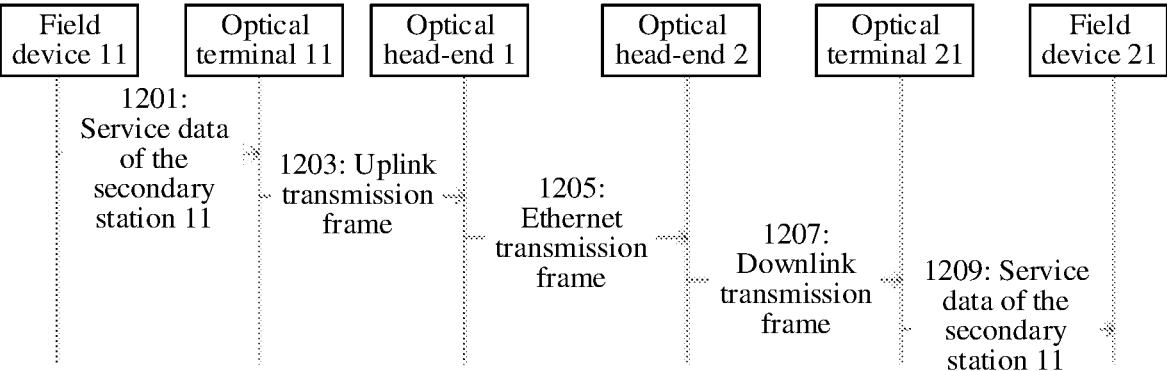
FIG. 12 is a schematic flowchart of a method for communication between field devices across PLCs through an optical communication network according to an embodiment of this application.

Because an optical head-end has an Ethernet communication interface, not only a plurality of field devices managed by a same controller can communicate with each other, but also field devices managed by different controllers can communicate with each other. As shown in FIG. 12, the field device 11 may send a message or service data to the field device 21. A networking relationship between the field device 11 and the field device 21 is shown in FIG. 3.

1201: The field device 11 sends secondary station service data to the optical terminal 11.

1203: The optical terminal 11 encapsulates the secondary station service data of the field device 11 into an uplink data frame. The uplink data frame includes a PDU, and a destination identifier carried in the PDU is an identifier of the field device 21.

1205: The optical head-end 1 receives the uplink data frame sent by the optical terminal 11, determines, by parsing the PDU included in the uplink data frame, that the destination identifier carried in the PDU is neither an identifier of the controller 1 nor an identifier of any field device managed by the controller 1, and therefore sends the PDU to another optical head-end through the head-end Ethernet module. Optionally, identifiers of field devices are defined according to a specific rule. The optical head-end 1 may identify, based on the identifier of the field device 21, that the field device 21 is a field device managed by the controller 2. Therefore, the optical head-end 1 may send the PDU to the optical head-end 2. In a possible implementation, some bits of an identifier of a field device include an identifier of a controller. The optical head-end may determine, by parsing the identifier of the field device, the identifier of the controller that controls or manages the field device.

1207: The optical head-end 2 receives the Ethernet packet sent by the optical head-end 1, and determines, by parsing the destination identifier in the PDU in the Ethernet packet, that a destination recipient of the PDU is the field device 21. The optical head-end 2 encapsulates the PDU into a downlink transmission frame, and sends the downlink transmission frame to the optical terminal 21.

1209: The optical terminal 21 parses the downlink transmission frame, and sends service data included in the PDU to the field device 21.

It can be learned that because the point-to-multipoint optical communication network naturally has features such as low latency, high bandwidth, and low jitter, communication between a controller and a field device and communication between field devices in the industrial control system based on optical communication provided in this application also have features such as low latency, high bandwidth, and low jitter.

Figure 13:
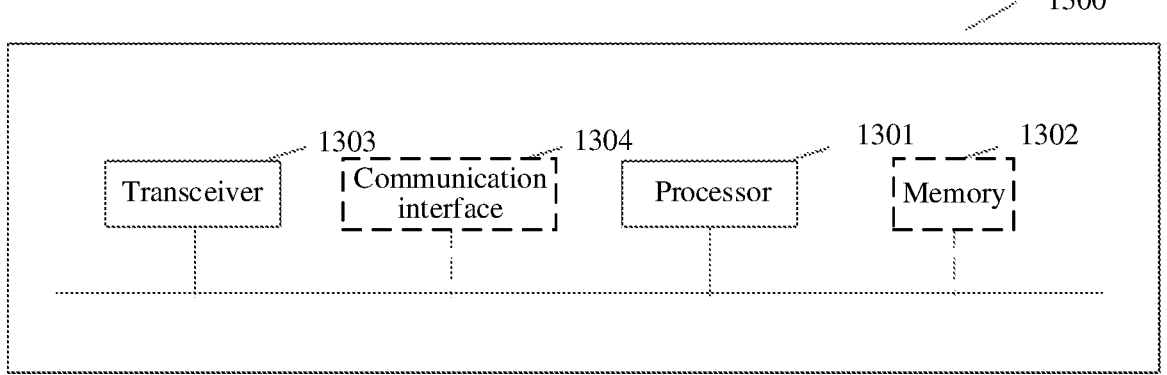
FIG. 13 is a schematic diagram of a structure of an optical head-end or an optical terminal according to an embodiment of this application.

This application further provides a device 1300. The device 1300 may be specifically configured to implement a function of an optical head-end or an optical terminal in embodiments of this application. As shown in FIG. 13, the device includes a processor 1301 and a transceiver 1303. The processor 1301 and the transceiver 1303 are connected to each other through a line.

The processor 1301 may be a general-purpose central processing unit (Central Processing Unit, CPU), a microprocessor, an application-specific integrated circuit ASIC, or at least one integrated circuit, and is configured to execute a related program, to implement technical solutions provided in embodiments of the present invention. The processor may independently have a PON-related protocol media access control (MAC) function, or may implement a PON protocol MAC function through an external chip, to implement communication between an optical head-end and an optical terminal. The device 1300 may include a plurality of processors, and each processor may include one or more CPUs. The processor 1301 is specifically responsible for performing the method related to the optical head-end or the optical terminal in this application, and communicating with the optical head-end or the optical terminal through the transceiver 1303. When the device 1300 is configured to implement the function of the optical head-end, the processor 1301 may correspond to the head-end service module 402 and the head-end point-to-multipoint module 404 in FIG. 4. When the device 1300 is configured to implement the function of the optical terminal, the processor 1301 may correspond to the terminal point-to-multipoint module 502 and the terminal service module 503 in FIG. 5.

The transceiver 1303 is configured to perform functions of sending and receiving uplink and downlink data frames in the foregoing embodiments. The transceiver 1303 includes an optical transmitter and/or an optical receiver. The optical transmitter may be configured to send an optical signal, and the optical receiver may be configured to receive the optical signal. The optical transmitter may be implemented through a light-emitting device, for example, a gas laser, a solid-state laser, a liquid laser, a semiconductor laser, or a directly modulated laser. The optical receiver may be implemented through an optical detector, for example, a photodetector or a photodiode (such as an avalanche photodiode). The transceiver 1303 may further include a digital-to-analog converter and an analog-to-digital converter. The transceiver 1303 may further include a wavelength-division multiplexer, configured to implement multiplexing and demultiplexing of optical signals of different wavelengths. When the device 1300 is configured to implement the function of the optical head-end, the transceiver 1303 may correspond to the head-end optical module 405 in FIG. 4. When the device

1300 is configured to implement the function of the optical terminal, the transceiver 1303 may correspond to the terminal optical module 501 in FIG. 5.

Optionally, the device 1300 may further include a memory 1302. The memory 1302 is configured to store program instructions and data. The memory may be a read-only memory (ROM), a static storage device, a dynamic storage device, or a random access memory (RAM). When the technical solutions provided in embodiments of the present invention are implemented through software or firmware, program code used for implementing the technical solutions provided in embodiments of the present invention is stored in the memory 1302, and is executed by the processor 1301.

In a possible implementation, the processor 1301 may include the memory 1302. In another possible implementation, the processor 1301 and the memory 1302 are two independent structures.

When the device 1300 is configured to implement the function of the optical head-end, the device 1300 may further include one or more other communication interfaces 1304, for example, a communication interface communicating with a controller and an Ethernet communication interface communicating with another optical head-end. When the device 1300 is configured to implement the function of the optical terminal, the device 1300 may also include one or more other communication interfaces 1304. For example, when the optical terminal and a field device are separately deployed, the optical terminal communicates with the field device through the communication interface 1304.

It should also be noted that the system, method, and apparatus provided in this application not only may be applied to the field of industrial control, but also may be applied to any device control scenario. Any controller or server may operate and control a device through the system and method provided in this application, and beneficial effects of low latency and high bandwidth brought by optical communication can also be obtained.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of procedures or functions in embodiments of the present invention are executed. The computer may be a general-purpose computer, a dedicated computer, a computer network, or any other programmable apparatus. The computer instructions may be stored in a computer-readable storage medium, or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

What is claimed is:

1. A method, comprising:

obtaining, by a first optical head-end, a first primary station packet from a first controller, wherein the first primary station packet comprises a first primary station data unit, the first primary station data unit comprises a first destination identifier and first service data, the first destination identifier comprised in the first primary station data unit is an identifier of a first field device, the first field device is controlled by the first controller, and the first destination identifier comprised in the first primary station data unit identifies a destination recipient of the first service data;

determining, by the first optical head-end based on the first destination identifier comprised in the first primary station data unit, a first optical terminal connected to the first field device;

constructing, by the first optical head-end, a first downlink transmission frame, wherein the first downlink transmission frame comprises the first primary station data unit and a first header field corresponding to the first primary station data unit, the first header field corresponding to the first primary station data unit comprises an identifier of the first optical terminal or a first broadcast optical terminal identifier, and the identifier of the first optical terminal or the first broadcast optical terminal identifier indicates to the first optical terminal to process the first primary station data unit;

sending, by the first optical head-end, the first downlink transmission frame to the first optical terminal through an optical signal;

obtaining, by the first optical head-end, a second primary station packet sent by the first controller, wherein the second primary station packet comprises a third primary station data unit, the third primary station data unit comprises a fourth destination identifier and third service data, and the fourth destination identifier comprised in the third primary station data unit is an identifier of a second controller;

determining, by the first optical head-end based on the identifier of the second controller, a media access control (MAC) address of a second optical head-end corresponding to the second controller; and sending, by the first optical head-end, the third primary station data unit to the second optical head-end based on the MAC address of the second optical head-end.

2. The method according to claim 1, wherein the first primary station packet further comprises a second primary station data unit, the second primary station data unit comprises a second destination identifier and second service data, the second destination identifier comprised in the second primary station data unit is an identifier of a second field device, and the second field device is controlled by the first controller; and wherein the method further comprises:

determining, by the first optical head-end based on the second destination identifier comprised in the second primary station data unit, a second optical terminal connected to the second field device, wherein the first downlink transmission frame constructed and sent by the first optical head-end further comprises the second primary station data unit and a second header field corresponding to the second primary station data unit, the second header field corresponding to the second primary station data unit comprises an identifier of the second optical terminal or the first broadcast optical terminal identifier, and the identifier of the second optical terminal or the first broadcast optical terminal identifier indicates to the second optical terminal to process the second primary station data unit.

3. The method according to claim 2, wherein:

when the second primary station data unit and the first primary station data unit correspond to a same header field, the first broadcast optical terminal identifier is comprised in the same header field; and when the second primary station data unit and the first primary station data unit correspond to different header fields, the first header field corresponding to the first primary station data unit comprises the identifier of the first optical terminal, and the second header field corresponding to the second primary station data unit comprises the identifier of the second optical terminal.

4. The method according to claim 2, wherein after sending, by the first optical head-end, the first downlink transmission frame, the method further comprises:

receiving, by the first optical head-end, a first uplink transmission frame, wherein the first uplink transmission frame comprises a first uplink transmission subframe, the first uplink transmission subframe comprises a third header field and a first secondary station data unit, the third header field in the first uplink transmission subframe comprises the identifier of the first optical terminal, the first secondary station data unit comprises service data of the first field device and a first source identifier, and the first source identifier in the first secondary station data unit is the identifier of the first field device.

5. The method according to claim 4, wherein the first uplink transmission frame received by the first optical head-end further comprises a second uplink transmission subframe, the second uplink transmission subframe comprises a fourth header field and a second secondary station data unit, the fourth header field in the second uplink transmission subframe comprises the identifier of the second optical terminal, the second secondary station data unit comprises service data of the second field device and a second source identifier, and the second source identifier in the second secondary station data unit is the identifier of the second field device.

6. The method according to claim 4, wherein the first secondary station data unit further comprises a third destination identifier, and the method further comprises:

determining, by the first optical head-end based on the third destination identifier comprised in the first secondary station data unit, a path for forwarding the first secondary station data unit.

7. The method according to claim 6, wherein determining, by the first optical head-end based on the third destination identifier comprised in the first secondary station data unit, the forwarding path comprises:

when the third destination identifier comprised in the first secondary station data unit is an identifier of the first controller, sending, by the first optical head-end, the first secondary station data unit to the first controller.

8. The method according to claim 6, wherein determining, by the first optical head-end based on the third destination identifier comprised in the first secondary station data unit, the forwarding path comprises:

when the third destination identifier comprised in the first secondary station data unit is the identifier of the second field device, constructing, by the first optical head-end, a second downlink transmission frame based on the first secondary station data unit, wherein the second downlink transmission frame comprises the first secondary station data unit.

9. The method according to claim 1, further comprising:

receiving, by the first optical head-end, a second uplink transmission frame, wherein the second uplink transmission frame comprises a third uplink transmission subframe, the third uplink transmission subframe comprises a fifth header field and a third secondary station data unit, the fifth header field in the third uplink transmission subframe comprises the identifier of the first optical terminal, the third secondary station data unit comprises service data of the first field device, a third source identifier, and a fifth destination identifier, the third source identifier in the third secondary station data unit is the identifier of the first field device, the fifth destination identifier comprised in the third secondary station data unit is an identifier of a third field device, and the third field device is controlled by the second controller;

determining, by the first optical head-end based on the fifth destination identifier comprised in the third secondary station data unit, the MAC address of the second optical head-end corresponding to the second controller; and sending, by the first optical head-end, the third secondary station data unit to the second optical head-end based on the MAC address of the second optical head-end.

10. A method, comprising:

receiving, by a first optical terminal, a downlink optical signal from a first optical head-end, wherein the downlink optical signal comprises a first downlink transmission frame, the first downlink transmission frame comprises a first primary station data unit and a first header field corresponding to the first primary station data unit, the first header field corresponding to the first primary station data unit comprises an identifier of the first optical terminal or a broadcast optical terminal identifier, the first primary station data unit comprises a first destination identifier and first service data, the first destination identifier comprised in the first primary station data unit is an identifier of a first field device, and the first optical terminal is connected to the first field device;

determining, by the first optical terminal based on the identifier of the first optical terminal or the broadcast optical terminal identifier comprised in the first header field corresponding to the first primary station data unit, that the first primary station data unit is a to-be-processed data unit; and performing the following:

sending, by the first optical terminal, the first service data to the first field device based on the identifier of the first field device comprised in the first primary station data unit; or operating or controlling the first field device based on the first service data;

wherein the first primary station data unit further comprises at least one of the following fields: a data type field, an operation type field, a secondary station operation address offset field, a payload length field, a packet sequence number field, a priority field, a last packet data unit indication field, a secondary station event field, or a response error code field; and wherein sending, by the first optical terminal, the first service data to the first field device, or operating or controlling the first field device based on the first service data, comprises:

sending, by the first optical terminal to the first field device, an operation type and a secondary station operation address offset that are comprised in the first primary station data unit, or operating or controlling the first field device based on the operation type and the secondary station operation address offset that are comprised in the first primary station data unit.

11. The method according to claim 10, further comprising:

when the first header field corresponding to the first primary station data unit comprises the broadcast optical terminal identifier, determining, by the first optical terminal based on the first destination identifier comprised in the first primary station data unit, that the first primary station data unit is the to-be-processed data unit.

12. The method according to claim 10, further comprising:

obtaining, by the first optical terminal, service data of the first field device; and encapsulating, by the first optical terminal, the service data of the first field device into a first uplink transmission subframe, wherein the first uplink transmission subframe comprises a second header field and a first secondary station data unit, the second header field in the first uplink transmission subframe comprises the identifier of the first optical terminal, the first secondary station data unit comprises the service data of the first field device and a first source identifier, and the first source identifier in the first secondary station data unit is the identifier of the first field device; and sending, by the first optical terminal, the first uplink transmission subframe to the first optical head-end through an optical signal.

13. The method according to claim 10, further comprising:

encapsulating, by the first optical terminal, service data of the first field device into a second uplink transmission subframe, wherein the second uplink transmission subframe comprises a third header field and a third secondary station data unit, the third header field in the second uplink transmission subframe comprises the identifier of the first optical terminal, the third secondary station data unit comprises the service data of the first field device, a second source identifier, and a second destination identifier, the second source identifier in the third secondary station data unit is the identifier of the first field device, and the second destination identifier comprised in the third secondary station data unit is an identifier of another field device; and sending, by the first optical terminal, the second uplink transmission subframe to the first optical head-end through an optical signal.

14. The method according to claim 10, wherein the first optical head-end is an optical line terminal (OLT), and the first optical terminal is an optical network unit (ONU) or an optical network terminal (ONT); and wherein an identifier of the first optical head-end and the identifier of the first optical terminal each are a passive optical network (PON) identifier, and a type of each respective PON identifier comprises a gigabit-capable passive optical network encapsulation mode (GEM) port identifier or an Ethernet passive optical network (EPON) logical link identifier (LLID).

15. The method according to claim 10, wherein the first downlink transmission frame is in a gigabit-capable passive optical network encapsulation mode (GEM) frame format, and the first header field comprised in the first downlink transmission frame is a GEM frame header field.

16. The method according to claim 10, wherein a data type indicated by the data type field comprises any one of the following data types: periodic real-time data type, random access data type, management data type, or security data type; and wherein:

when the data type indicated by the data type field is the periodic real-time data type or the random access data type, a command type indicated by the operation type field comprises any one of the following types: a read operation type, a write operation type, a read/write operation type, a broadcast write operation type, or a loopback test type; or when the data type indicated by the data type field is the management data type, a command type indicated by the operation type field comprises any one of the following types: a read operation type, a read response operation type, a set operation, or a set response operation type.

17. An apparatus, comprising:

a transceiver, configured to send and receive optical signals;

at least one processor; and a non transitory memory storing instructions that are executable by the at least one processor, wherein when the instructions are executed, the apparatus serves as a first optical head-end and performs operations comprising:

obtain a first primary station packet from a first controller, wherein the first primary station packet comprises a first primary station data unit, the first primary station data unit comprises a first destination identifier and first service data, the first destination identifier comprised in the first primary station data unit is an identifier of a first field device, the first field device is controlled by the first controller, and the first destination identifier comprised in the first primary station data unit identifies a destination recipient of the first service data;

determine, based on the first destination identifier comprised in the first primary station data unit, a first optical terminal connected to the first field device; and construct a first downlink transmission frame, wherein the first downlink transmission frame comprises the first primary station data unit and a first header field corresponding to the first primary station data unit, the first header field corresponding to the first primary station data unit comprises an identifier of the first optical terminal or a broadcast optical terminal identifier, and the identifier of the first optical terminal or the broadcast optical terminal identifier indicates to the first optical terminal to process the first primary station data unit;

send the first downlink transmission frame to the first optical terminal through an optical signal;

obtain a second primary station packet sent by the first controller, wherein the second primary station packet comprises a third primary station data unit, the third primary station data unit comprises a fourth destination identifier and third service data, and the fourth destination identifier comprised in the third primary station data unit is an identifier of a second controller;

determine, based on the identifier of the second controller, a media access control (MAC) address of a second optical head-end corresponding to the second controller; and send the third primary station data unit to the second optical head-end based on the MAC address of the second optical head-end.

18. The apparatus according to claim 17, wherein the first primary station packet further comprises a second primary station data unit, the second primary station data unit comprises a second destination identifier and second service data, the second destination identifier comprised in the second primary station data unit is an identifier of a second field device, and the second field device is controlled by the first controller; and wherein the operations further comprise:

determining, based on the second destination identifier comprised in the second primary station data unit, a second optical terminal connected to the second field device, wherein the first downlink transmission frame constructed and sent by the first optical head-end further comprises the second primary station data unit and a second header field corresponding to the second primary station data unit, the second header field corresponding to the second primary station data unit comprises an identifier of the second optical terminal or the broadcast optical terminal identifier, and the identifier of the second optical terminal or the broadcast optical terminal identifier indicates to the second optical terminal to process the second primary station data unit.

19. An apparatus, comprising:

a transceiver, configured to send and receive optical signals;

at least one processor; and a non-transitory computer readable storage medium storing instructions that are executable by the at least one processor, and when the instructions are executed, the apparatus serves as a first optical terminal and performs operations comprising:

receive a downlink optical signal from a first optical head-end, wherein the downlink optical signal comprises a first downlink transmission frame, the first downlink transmission frame comprises a first primary station data unit and a first header field corresponding to the first primary station data unit, the first header field corresponding to the first primary station data unit comprises an identifier of the first optical terminal or a broadcast optical terminal identifier, the first primary station data unit comprises a first destination identifier and first service data, the first destination identifier comprised in the first primary station data unit is an identifier of a first field device, and the first optical terminal is connected to the first field device;

determine, based on the identifier of the first optical terminal or the broadcast optical terminal identifier comprised in the first header field corresponding to the first primary station data unit, that the first primary station data unit is a to-be-processed data unit; and perform the following:

send, the first service data to the first field device based on the identifier of the first field device comprised in the first primary station data unit; or operate or control the first field device based on the first service data;

wherein the first primary station data unit further comprises at least one of the following fields: a data type field, an operation type field, a secondary station operation address offset field, a payload length field, a packet sequence number field, a priority field, a last packet data unit indication field, a secondary station event field, or a response error code field; and wherein sending the first service data to the first field device, or operating or controlling the first field device based on the first service data, comprises:

sending, to the first field device, an operation type and a secondary station operation address offset that are comprised in the first primary station data unit, or operating or controlling the first field device based on the operation type and the secondary station operation address offset.

20. The apparatus according to claim 19, wherein the operations further comprise:

when the first header field corresponding to the first primary station data unit comprises the broadcast optical terminal identifier, determining, based on the first destination identifier comprised in the first primary station data unit, that the first primary station data unit is the to-be-processed data unit.

\*   \*   \*   \*   \*